April 24, 1956  W. A. BEDFORD, JR  2,742,984
MOLDING FASTENER
Filed April 8, 1952

INVENTOR:
WILLIAM A. BEDFORD JR.,
BY Robert E Ross
AGENT.

United States Patent Office 2,742,984
Patented Apr. 24, 1956

2,742,984

MOLDING FASTENER

William A. Bedford, Jr., North Scituate, Mass., assignor, by mesne assignments, to United-Carr Fastener Corporation, Boston, Mass., a corporation of Delaware Application April 8, 1952, Serial No. 281,128

2 Claims. (Cl. 189—88)

This invention relates generally to fastening devices, and has particular reference to a fastener for securing a channeled molding to a support.

In the construction of bodies for automobiles and the like, the provision of suitable attaching means for trim moldings has been a continuing problem; since the design of the molding and its position on the vehicle body varies in different models. In some types of vehicle bodies it has been desirable to attach a molding to a door at the lower edge of the window opening. In such applications the attachment of the molding presents an additional difficulty since there is no supporting area for the upper edge of the molding to bear against. As a result such attachments have presented a difficult problem, and fasteners previously used for this purpose have been generally unsatisfactory in failing to provide a secure attachment.

In one type of construction the outer door shell has an outwardly bowed portion spaced from the window opening forming a horizontal crease, and the molding is designed to be sufficiently wide to extend between said crease and the edge of the door shell at the window opening. In such cases it has been found impossible to maintain this distance with the degree of accuracy required to permit the use of the upper edge of the door shell as positioning means in assembly of the molding. Although this distance can be held so as not to exceed a predetermined amount, it is not possible to insure that it will always be within the required tolerances. As a result, in such constructions, if the molding is hooked onto the upper edge of the door shell, the lower edge is not always properly positioned in relation to the crease, but may be slightly above or below the required position.

The object of the invention is to provide a fastener for securely and rapidly attaching a channeled molding to the edge of a support.

A further object of the invention is to provide a fastener which is adapted for pre-assembly into a channeled molding in which the fastener has a pair of arms for straddling the edge of a support, one of which is adapted both for engagement in the molding and engagement in a positioning opening in the support.

Another object of the invention is to provide a molding fastener for attaching a channeled molding to an edge of a support in which means is provided for positioning the fastener on the support independent of the edge thereof.

Other objects of the invention will, in part, be obvious, and will, in part, appear hereinafter.

Figure 1:
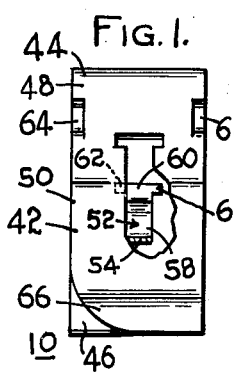
Fig. 1 is a plan view of a molding fastener embodying the features of the invention.

Referring to the drawing, there is illustrated a molding fastener 10, which is adapted for assembly into a channeled molding 12, to enable the molding to be attached to the edge of a support 14.

In the illustrated embodiment, the support 14 may be an automobile door or the like, and the portion illustrated is that part of the door disposed immediately below the window opening, and comprises an outer door shell 16 having an upper edge 18, an offset portion 20 disposed therebelow having a positioning opening 21 disposed therein, and an outwardly and downwardly extending door portion 22 extending from the offset portion and forming a horizontal bowed crease 23. An inner stiffening rail member 24 may be provided on the inner side of the door shell, which may be attached thereto by spot welding or other means, and the member 24 may be provided with an offset portion 26 for attachment to the offset portion 20 of the door shell, providing an aperture 28 therebetween.

The molding 12 is designed to have its lower edge in substantial alignment with the crease 23 which forms the upper edge of the outwardly bowed portion 22, and to extend over the upper edge of the outer body shell, and opposing inturned edges 32 and 34 forming recesses 36 and 38 respectively.

The fastener 10 is preferably formed of a single piece of sheet metal and is generally U-shaped, with opposing arms 40 and 42 which are joined at one end 44. The arm 40 is substantially flat throughout the greater portion of its length, and has an end portion 46 which is inclined toward the other arm 42. The arm 42 has a portion 48 adjacent the junction 44 which is inclined away from the other arm, and a portion 50 extending therefrom which extends substantially parallel to the other arm in the normal position. To provide means for positioning and retaining the fastener in assembly with the support, a stud member 52 is provided on the arm 42, which is formed from the material thereof, and in the illustrated embodiment comprises a single sheared tongue which is so formed as to provide a pair of legs 54 and 56 joined by a head portion 58. The leg 54 is integral with the arm 42, and the leg 56 is free-ended, and is provided with a bearing end portion 60 having laterally extending tabs 62 for bearing against the arm 42 for support. Spring arms 64 are provided on the inclined portion 48 of the arm 42, and extend therefrom toward the other arm for frictional engagement with a portion of the support as will become apparent hereafter.

The opposite ends of the bent fastener are adapted to seat in the opposite recesses of the molding, and to this end, the junction 44 is smoothly rounded to conform to the inner shape of the recess 36, and the end portion 66 of the arm 42 is curled slightly inwardly to partially conform to the shape of the recess 38. To facilitate assembly of the fastener into the molding, the end portion 66 of the arm 42 is provided with a rounded corner for a purpose to appear hereinafter.

Figure 2:
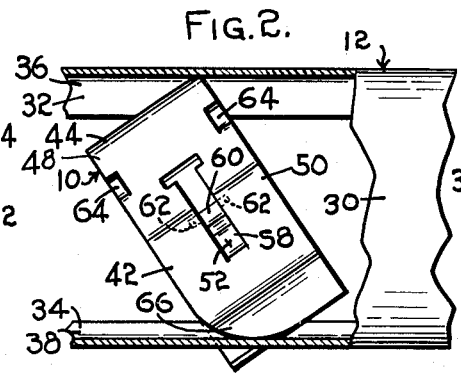
Fig. 2 is a plan view of the molding fastener of Fig. 1 illustrating the method of assembly of the fastener into a channel-shaped molding.
Figure 3:
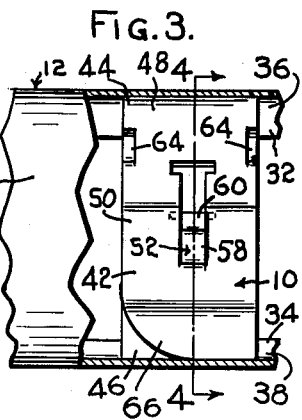
Fig. 3 is a plan view of the assembled fastener and molding.
Figure 4:
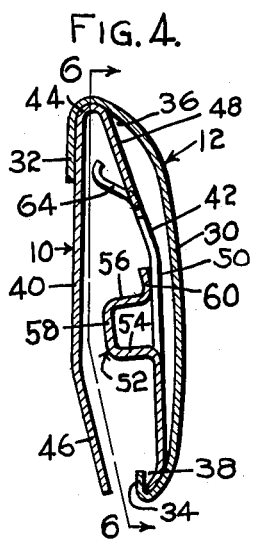
Fig. 4 is a view in section taken on line 4—4 of Fig. 3.
Figure 5:
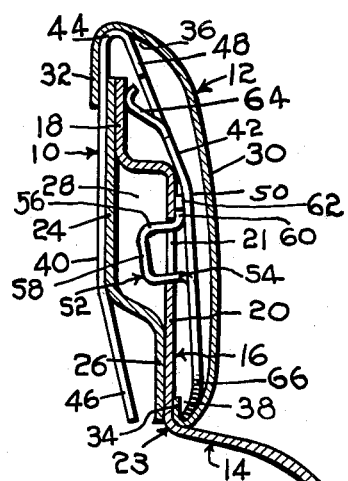
Fig. 5 is a view similar to Fig. 4 in which the fastener and molding assembly has been attached to the edge of a support.
Figure 6:
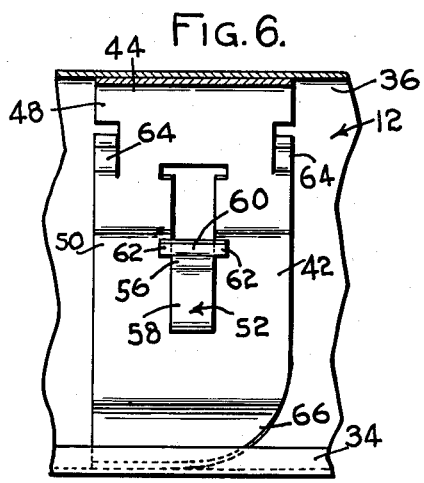
Fig. 6 is a view in section taken on line 6—6 of Fig. 5.

To assemble the fastener into the molding, the fastener is rotated to allow the arm 42 to pass between the inturned edges of the molding (see Fig. 2) so that the rounded corner on end 66 is adjacent one side of the molding. The fastener may then be rotated to pass the junction 44 of the arms and the end 66 of the arm 42 into the recesses 36 and 38, whereby the opposite edges of the molding spring slightly apart to permit the fastener to snap into the vertical position shown in Fig. 3.

After a suitable number of fasteners have been so assembled into the molding, the molding may be assembled onto the support by hooking the arm 40 over the upper edge of the support and sliding the assembled fasteners and molding downwardly until the stud 52 enters the opening 21. The relative dimensions of the various parts are such that when in the assembled position, the arms 40 and 42 are sprung apart, so that the lower edge of the molding is held securely against the support by the spring tension in the arms. After such assembly the spring arms 64 bear against the upper edge portion 18 of the support to pull the upper end of the arm 40 tightly against the support.

One principal advantage of the illustrated construction is that the fasteners may be preassembled into the molding, and the molding may then be attached to the support without access being available to the rear of the support. Another advantage is that variations in the distance between the upper edge of the outer door shell and the crease at the upper edge of the outwardly rounded portion of the door shell do not affect the assembly, since the position of the molding relative to the upper edge of the outwardly bowed portion 22 of the door shell is determined by the position of the opening 21, and the position of this opening in relation to the position of the upper edge of the outwardly bowed portion can be held to close tolerances. For this reason the lower edge of the molding will always be aligned with the crease at the upper edge of the outwardly bowed portion of the door shell, since the position of the molding on the door is not affected by the distance from the crease to the upper edge.

The use of the fastener of the invention is not restricted to attachment to the upper edge of the supports. In some cases it may be used to attach a molding to an intermediate position on a support by providing a slot opening above a positioning opening into which the arm 40 may be hooked. It will also be understood that other forms of stud members than that illustrated may be used.

Since certain other obvious modifications may be made in the device without departing from the scope of the invention, it is intended that all matter contained herein be interpreted in an illustrative and not in a limiting sense.

I claim:

1. A molding fastener for attaching a channel-shaped molding having inturned edges to a support, comprising a U-shaped member having opposed arms for straddling an edge of the support, one of said arms being outwardly bowed away from the other arm to conform to the shape of the molding, said outwardly bowed arm having a longitudinal strip formed therefrom into a stud comprising a pair of legs extending therefrom in spaced relation to each other toward the other arm and a connecting head, one of said legs being joined to said one arm, the other leg terminating in a free end having means thereon disposed between the arms for bearing against the arm from which it is formed.

2. A molding assembly, comprising a support having a pair of plates with superimposed portions at one edge and separated portions in spaced relation to said one edge, one of said plates having an aperture in said separated portion, a molding fastener assembled onto the support, said fastener comprising a pair of legs joined at one end and straddling said edge, one of said legs having stud means protruding therefrom toward the other leg and into said opening, said leg also having a spring arm extending therefrom and bearing against said one plate adjacent the edge, and a channelled molding assembled onto said one leg.

References Cited in the file of this patent
UNITED STATES PATENTS

| | | |
|---|---|---|
| 2,133,837 | Wiley | Oct. 18, 1938 |
| 2,184,255 | Kral | Dec. 19, 1939 |
| 2,428,338 | Poupitch | Sept. 30, 1947 |
| 2,451,591 | Tinnerman | Oct. 19, 1948 |